United States Patent Office 2,766,260
Patented Oct. 9, 1956

2,766,260
METHINE DYESTUFF INTERMEDIATES

Nicholas J. Kartinos, Nazareth, Pa., assignor to General Aniline & Film Corporation, New York, N. Y., a corporation of Delaware No Drawing. Application October 9, 1953,
Serial No. 385,267

1 Claim. (Cl. 260—347.4)

This invention relates to methine dye intermediates and particularly to a new class of tetrahydrofurfuryl esters which are employed as intermediates in the preparation of vivid or fluorescent methine dyes for coloring lacquers, resins, printing inks and for dyeing acetate rayon, polyesters, and other fibers.

It is known that methine dyes prepared by the condensation of aromatic p-aminoaldehydes, such as, for example, p-diethylaminobenzaldehydes, p - N - butyl - N - isobutyl-aminobenzaldehydes, p-(N-phenyl-N-methyl)-aminobenz-aldehyde and the like, with an active methylene compound, such as, cyanoacetic acid, esters or amides thereof, malonic acid, malonitrile, malonic esters, have been proposed for the dyeing of cellulose acetate and other synthetic fibers from their aqueous suspensions or solutions. Despite the fact that all of these dyes dye cellulose acetate and other synthetic fibers, the shades obtained, however, are essentially non-fluorescent and the fastness to light and washing is only fair.

I have found that by using tetrahydrofurfuryl esters of cyanoacetic or malonic acid as the active methylene compounds in the aforesaid condensation reaction, one can obtain dyestuffs which dye cellulose acetate and other synthetic textile fibers with very bright, fluorescent yellow to red-orange shades of excellent fastness to light. In addition to this property, the dyestuffs possess unusual wash fastness. The tint is bathochromic when compared to the analogous dyestuffs from the aromatic p-aminoaldehydes and the foregoing active methylene compounds. Moreover, the dyes when employed as fluorescent substances yield a fluorescent yellow to orange color which is redder, brighter and stronger than any of the heretofore employed methine dyes of similar fluorescent range.

Accordingly, it is the principal object of the present invention to provide a new class of tetrahydrofurfuryl esters which are of value as intermediates for the preparation of methine dyes of fluorescent substances. These esters are characterized by the following general formula:

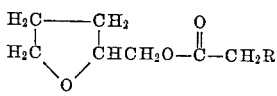

wherein R represents a halogen such as bromine and chlorine, cyano and carbalkoxy. The alkyl portion of the carbalkoxy is lower alkyl of 1 to 5 carbon atoms, such as, methyl, ethyl, butyl, isobutyl, propyl, isopropyl and amyl which may be substituted by a chloro, cyano, hydroxy, or tetrahydrofuryl group.

The esters characterized by the foregoing general formula are readily and conveniently prepared by condensing a negatively substituted acetic acid, cyanoacetic acid, a potential cyanoacetic acid (e. g. haloacetic acid), malonic acid or its half ester with tetrahydrofurfuryl alcohol in the presence of an acid catalyst, such as, for example, hydrochloric acid, hydrogen chloride, sulfuric acid, phospholeum, and phenyl and alkane sulfonic acids.

The negatively substituted acetic acids employed, are for example, α-monohaloacetic acid, e. g. chloroacetic acid, bromoacetic acid, iodoacetic acid, cyanoacetic acid, α-carboxyacetic acid, e. g. malonic acid, α-carbalkoxy-acetic acid, monomethyl malonate, monoethyl malonate, monopropyl malonate, monobutyl malonate and the like; α-carb(substituted alkoxy)acetic acid, monohydroxymethyl malonic, monohydroxyethyl malonic, monohydroxypropyl malonate, monohydroxybutyl malonate, etc. monocyanoethyl malonate, monocyanopropyl malonate, monocyanobutyl malonate, α - (tetrahydrofuryl)methyl malonate, and the like.

Instead of condensing tetrahydrofurfuryl alcohol with cyanoacetic acid to obtain tetrahydrofurfuryl cyanoacetate the same ester may be obtained by causing a metal cyanide such as, sodium cyanide, to react with tetrahydrofurfuryl chloro or bromo acetate under normal reaction conditions.

The following examples will illustrate how the new dye intermediates are prepared. It is to be clearly understood that they are merely illustrative and are not to be construed as being limitative. The parts given are all by weight unless otherwise specified.

Example 1

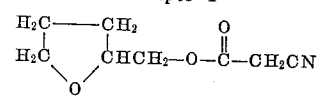

2 moles (170 grams) of cyanoacetic acid, 2.2 moles (222 grams) of tetrahydrofurfuryl alcohol, 300 ml. chloroform, and 10 grams of mixed lower alkane sulfonic acids were added to a reaction flask and equipped with a water separator and a condenser; the mixture was heated under reflux until no more water separated. After cooling, the reaction mixture was washed with dilute sodium hydroxide solution until all of the acids were neutralized and extracted. The organic layer was separated, dried and the chloroform removed by distillation. The residue was distilled under reduced pressure, to yield 196.5 grams of a colorless product having a boiling point of 140–44° C. at 0.5 mm., which corresponds to 59% of the theoretical amount.

Example 2

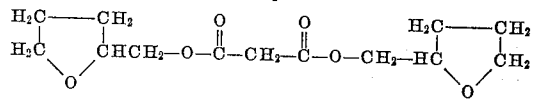

Example 1 was repeated with the exception that 2 moles of cyanoacetic acid were replaced by 1 mole (104 grams) of malonic acid.

Example 3

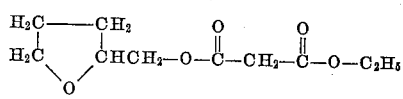

Example 1 was repeated with the exception that 2 moles of cyanoacetic acid were replaced by 2 moles (264 grams) of monoethyl malonate.

Example 4

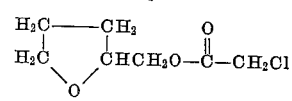

Example 1 was repeated with the exception that 2 moles of cyanoacetic acid were replaced by 2 moles (189 grams) of monochloroacetic acid.

Example 5

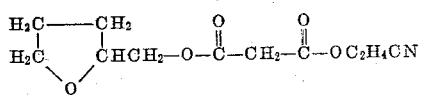

Example 1 was again repeated with the exception that 2 moles of cyanoacetic acid were replaced by 2 moles (314 grams) of monocyanoethylmalonate.

The following examples illustrate the utilization of the foregoing esters in the preparation of dyestuffs, inks, etc. having new and superior properties.

Example 6

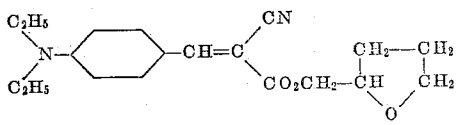

About 16.9 grams of tetrahydrofurfuryl cyanoacetate, 17.7 grams of 4-diethylaminobenzaldehyde, 50 ml. of 2-propanol and 5 drops of piperidine were combined and heated under reflux for 1 hour. Upon cooling and scratching a fluorescent, bright yellow solid was induced to crystallize. There was obtained 15 grams of dyestuff having a M. P. of 64–65° C. (46% of theory).

This compound dyes acetate silk in a brilliant green-yellow shade. As a dye it exhibits excellent light fastness and tinctorial strength and considerably improved wash fastness when compared to the methine compound derived from ethyl cyanoacetate and p-diethylaminobenzaldehyde.

Example 7

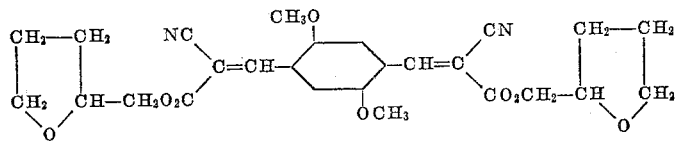

About 3.88 grams of 2,5-dimethoxyterephthaldehyde, 6.76 grams of tetrahydrofurfuryl cyanoacetate, 50 ml. of ethanol, and 2 drops of piperidine were combined and heated several minutes. A brilliant red-orange solid separated immediately. The solid was collected. There was obtained 8 grams of dyestuff having a M. P. of 40–46° C. (81% of theory).

This compound when appropriately mixed with bodied linseed oil results in a lithographic ink. A lithographic print from this ink is brilliant, fluorescent red-orange in color. It is brighter, redder, and stronger than the lithographic print that results when the dye derived from the above dialdehyde and ethyl cyanoacetate is employed.

When appropriately formulated with a resin (e. g. Beetle resin), and coated on paper, this compound results in a brilliant, fluorescent orange resin coating.

Example 8

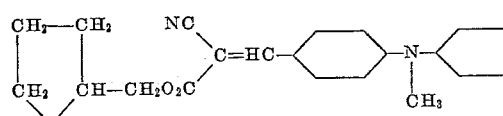

About 12 grams of N-methyl imino-p,p'-dibenzaldehyde, 17 grams of tetrahydrofurfuryl cyanoacetate, 50 ml. of 2-propanol, and 5 drops of piperidine were combined and heated under reflux for 30 minutes. The product crystallized on cooling. There was obtained 27.5 grams of a fluorescent orange solid having a M. P. of 102–108° C. (100% of theory).

This bis-methine compound when applied to acetate rayon is brilliant yellow dye with excellent light and wash fastness and exceptional tinctorial strength. When compared to the bis-methine derived from N-methyl imino-p,p'-dibenzaldehyde and ethyl cyanoacetate, the dyestuff of this example displayed enhanced tinctorial strength. It is also redder in shade. Thus, the tetrahydrofurfuryl group exhibits a bathochromic shift as compared to an ethyl group.

On Dacron (polyester) (DuPont trademark) fiber, the compound is a brilliant and fluorescent red-yellow dye. It has good light fastness and excellent wash fastness.

Example 9

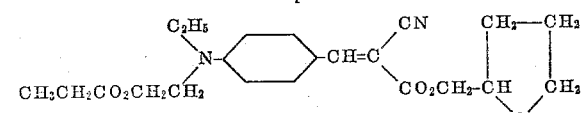

About 12.5 grams of N-ethyl-β-(4-formylphenyl)-aminoethyl propionate, 8.5 grams of tetrahydrofurfuryl cyanoacetate, 25 ml. of 2-propanol, and 5 drops of piperidine were combined and heated for 10 minutes under reflux. A yellow solid separated on cooling. There was obtained 17 grams of dyestuff having a M. P. of 73–75° C. (85% of theory).

The resulting compound is an excellent green-yellow dye for acetate rayon. It exhibits unusual tinctorial strength and wash fastness when compared to the methine derived from the above aldehyde and ethyl cyanoacetate.

Example 10

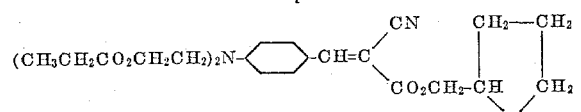

About 16 grams of β,β'-(4-formyl phenyl)-imino bis-ethyl propionate in 30 ml. of chloroform, 8.5 grams of tetrahydrofurfuryl cyanoacetate, and 5 drops of piperidine were combined and heated for 5 minutes under reflux. The chloroform was removed and the viscous residue crystallized from 100 ml. of ethanol. There was obtained 20.5 grams of a bright yellow solid having a M. P. of 90–92° C. (87% of theory).

This methine dye exhibits good affinity for cellulose acetate with excellent light and wash fastness and vivid green-yellow shade.

Example 11

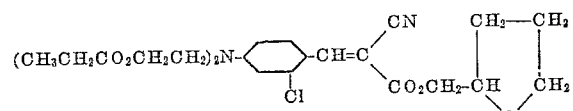

About 17.3 grams of β,β'-(3-chloro-4-formyl phenyl)- imino bis-ethyl propionate in 30 ml. of chloroform, 8.5 grams of tetrahydrofurfuryl cyanoacetate, and 5 drops of piperidine were combined and heated under reflux for 30 minutes. The chloroform was distilled off. The resulting oil resisted crystallization.

This methine compound dyes cellulose acetate in a vivid green-yellow shade with excellent wash and light fastness.

Example 12

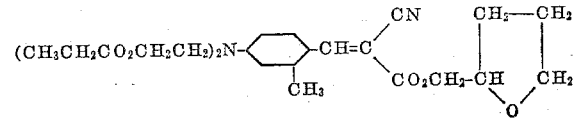

About 16 grams of β,β'-(3-methyl-4-formyl phenyl)-imino bis-ethyl propionate in 30 ml. of chloroform, 8.5 grams of tetrahydrofurfuryl cyanoacetate, and 5 drops of piperidine were combined and heated under reflux for 30 minutes. The chloroform was distilled off resulting in a heavy viscous oil.

The liquid methine compound dyes cellulose acetate a vivid green-yellow shade with excellent affinity, wash and light fastness.

*Example 13*

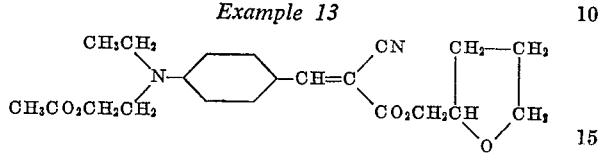

About 11.84 grams of N-ethyl-β-(4-formyl phenyl) amino ethyl acetate, 8.5 grams of tetrahydrofurfuryl cyanoacetate, 50 ml. of 2-propanol, and 5 drops of piperidine were combined and heated under reflux 30 minutes. Upon cooling a green-yellow solid resulted. It was collected and dried. There was obtained 15.5 grams of dyestuff having a M. P. of 61–64° C. (80% of theory).

This methine compound dyes cellulose acetate a vivid green-yellow color with excellent wash and light fastness and excellent affinity.

I claim:

Methine dye intermediate having the following formula:

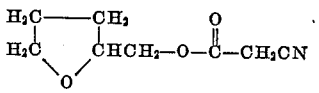

References Cited in the file of this patent

UNITED STATES PATENTS

| | | |
|---|---|---|
| 1,989,701 | Lawson | Feb. 5, 1935 |
| 2,234,615 | Alexander | Mar. 11, 1941 |
| 2,410,197 | Borglin | Oct. 29, 1946 |

OTHER REFERENCES

Eddy et al.: J. Econ. Entomol. 41, p. 33 (1948).